US007065743B2

(12) United States Patent
Blais et al.

(10) Patent No.: US 7,065,743 B2
(45) Date of Patent: Jun. 20, 2006

(54) APPARATUS AND METHOD FOR CACHING ANALYZED PROGRAM INFORMATION

(75) Inventors: Marc Noel Blais, Rochester, MN (US); Daniel Rodman Hicks, Byron, MN (US); James Albert Kryka, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 545 days.

(21) Appl. No.: 10/193,581

(22) Filed: Jul. 11, 2002

(65) Prior Publication Data

US 2004/0010774 A1 Jan. 15, 2004

(51) Int. Cl.
*G06F 9/44* (2006.01)

(52) U.S. Cl. ............... 717/108; 717/107; 717/166
(58) Field of Classification Search ........ 717/106–119, 717/131, 165–166, 146–148; 711/117–136
See application file for complete search history.

(56) References Cited

U.S. PATENT DOCUMENTS

| 5,047,918 A | 9/1991 | Schwartz et al. | 707/203 |
|---|---|---|---|
| 5,590,331 A | 12/1996 | Lewis et al. | 717/144 |
| 5,768,593 A | 6/1998 | Walters et al. | 717/141 |
| 5,819,275 A | 10/1998 | Badger et al. | 707/100 |
| 5,854,932 A | 12/1998 | Mariani et al. | 717/116 |
| 5,878,262 A | 3/1999 | Shoumura et al. | 717/164 |
| 5,905,895 A | 5/1999 | Halter | 717/139 |
| 5,966,539 A | 10/1999 | Srivastava | 717/156 |
| 5,978,815 A | 11/1999 | Cabrera et al. | 707/204 |
| 6,289,506 B1 * | 9/2001 | Kwong et al. | 717/148 |
| 6,799,315 B1 * | 9/2004 | Waki et al. | 717/148 |

OTHER PUBLICATIONS

Radhakrishnan, "Java Virtual Machine", CiteSeer, University of Kansas, Dept. of Electrical Engineering and Computer Science, pp. 1-37, Dec. 1997.*
Lindholm and Yellin, "The Java Virtual Machine Specification," Addison- Wesley, pp. 83-84, (1997).
Yellin, "The JIT Compiler API," p. 1 (1996), available at ftp://ftp.javasoft.com/jit-interface.ps.
Dean et al., "Vortez: an optimizing compiler for object-oriented languages," Oct. 1996, pp. 83-100.

* cited by examiner

*Primary Examiner*—Ted T. Vo
(74) *Attorney, Agent, or Firm*—Martin & Associates, LLC; Bret J. Petersen; Derek P. Martin (57) ABSTRACT

An apparatus and method provide a cache for analyzed program information when no class file can be identified. When loading a class, if there is an identifiable class file for the class, the class file is checked to determine if analyzed program information is attached. If so, the analyzed program information can be directly used without the overhead of analyzing the program information again. If there is no identifiable class file for the class, a cache is checked to see if there is an entry in the cache corresponding to the class. If there is no entry in the cache corresponding to the class, the program information is analyzed and saved in a cache entry for future use. If there is an entry in the cache corresponding to the class, the analyzed program information is retrieved and used, thereby saving the time required to repeatedly analyze the program information.

30 Claims, 7 Drawing Sheets

APPARATUS AND METHOD FOR CACHING ANALYZED PROGRAM INFORMATION

RELATED APPLICATION

This patent application is related to the pending U.S. patent application entitled "COMPUTER SYSTEM, PROGRAM PRODUCT AND METHOD UTILIZING EXECUTABLE FILE WITH ALTERNATE PROGRAM CODE ATTACHED AS A FILE ATTRIBUTE", Ser. No. 09/024,111, filed by Hicks on Feb. 17, 1998.

BACKGROUND OF THE INVENTION

1. Technical Field

This invention generally relates to computer systems, and more specifically relates to apparatus and methods for processing computer programs.

2. Background Art

Since the dawn of the computer age, computer systems have evolved into extremely sophisticated devices, and computer systems may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

Computer systems typically include operating system software that controls the basic function of the computer, and one or more software application programs that run under the control of the operating system to perform desired tasks. For example, a typical IBM Personal Computer may run the Microsoft Windows operating system, and under the control of the Windows operating system, a user may execute an application program, such as a word processor. As the capabilities of computer systems have increased, the application software programs designed for high performance computer systems have become extremely powerful. However, software development costs have continued to rise because more powerful and complex programs take more time, and hence more money, to produce.

One way in which the performance of application software programs has been improved while the associated development costs have been reduced is by using object-oriented programming concepts. The goal of using object-oriented programming is to create small, reusable sections of program code known as "objects" that can be quickly and easily combined and re-used to create new programs. This is similar to the idea of using the same set of building blocks again and again to create many different structures. The modular and re-usable aspects of objects will typically speed development of new programs, thereby reducing the costs associated with the development cycle. In addition, by creating and re-using a comprehensive set of well-tested objects, a more stable, uniform, and consistent approach to developing new computer programs can be achieved.

A central concept in object-oriented programming is the "class." A class is a template that defines a type of object. A class outlines or describes the characteristics or makeup of objects that belong to that class. By defining a class, objects can be created that belong to the class without having to rewrite the entire definition for each new object as it is created. This feature of object-oriented programming promotes the reusability of existing object definitions and promotes more efficient use of program code.

The Java programming language developed by Sun Microsystems is one modern object oriented programming language that has become very popular in recent years. Java offers many features and advantages that makes it a desirable programming language to use. First, Java is specifically designed to create small application programs, commonly called "applets," that can reside on the network in centralized servers, and which are delivered to the client machine only when needed. Second, Java is completely platform independent. A Java program can be written once and can then run on any type of platform that contains a Java Virtual Machine (JVM). The JVM model is supported by most computer vendors, thereby allowing a software vendor to have access to hardware and software systems produced by many different companies. Finally, Java is an object oriented language, meaning that software written in Java can take advantage of the benefits of object oriented programming techniques.

For Java to be platform-independent, a JVM typically converts the Java platform-independent bytecodes to corresponding platform-specific operations. This dynamic conversion of Java code creates undesirable overhead in the execution of a Java program. In many cases, this overhead is justified by the platform-independence that is achieved by programming in Java. In some cases, the overhead of performing real-time conversion of Java bytecodes may be reduced by processing the bytecodes of a Java class to generate platform-specific code, then saving the platform-specific code. The next time the same class is invoked, the platform-specific code can be retrieved instead of requiring real-time interpretation of the platform-independent Java bytecodes.

One specific way to improve the performance of a Java program is shown in U.S. Ser. No. 09/024,111 by Hicks filed on Feb. 17, 1998. This pending patent application discloses a way to process a class file to generate platform-dependent code, then save the platform-dependent code as an attribute of the original class file. In this manner, the class file may still be used by other platforms, but the platform-dependent code may be invoked by any computer system that is of the same platform type. By invoking platform-dependent code that has been pre-processed, the overhead of processing the platform-independent bytecodes is reduced, thereby enhancing the performance of the Java program.

The method disclosed in the '111 patent application allows attaching previously-processed information, referred to generically herein as analyzed program information, to a class file. Note, however, that in some cases, the class file is either unknown or is unavailable. For example, if bytecodes for a Java class are sent via a network connection, the parent class file may be unavailable. Likewise, in an IBM iSeries computer, a class may be created by passing bytecodes that define a Java class to a user-defined class loader, which then uses the defineClass interface to create the class represented by the bytecodes. In this case, the parent class of the bytecodes is unknown. Another way for a class file to be unknown is for a class to be generated dynamically. In all of these cases, there is no known class file to which the analyzed program information can be attached. For this reason, when no class file can be identified, the class information must be processed each time it is used. Without a way to save analyzed program information when no corresponding class file can be identified, JVMs will continue to suffer undue performance penalties by needlessly processing Java classes that have previously been processed.

DISCLOSURE OF INVENTION

According to the preferred embodiments, an apparatus and method provide a cache for analyzed program information when no class file can be identified. If a class file can be identified, the analyzed program information is attached to the class file. If no class file can be identified, the analyzed program information is stored in a cache separate from any class file. When loading a class, the apparatus and method of the invention check to see if there is an identifiable class file for the class. If so, the class file is checked to see if there is analyzed program information attached to the class file. If so, the analyzed program information can be directly used without the overhead of analyzing the program information again. If there is no identifiable class file for the class, a cache is checked to see if there is an entry in the cache corresponding to the class. If there is no entry in the cache corresponding to the class, the program information is analyzed and saved in a cache entry for future use. If there is an entry in the cache corresponding to the class, the analyzed program information is retrieved and used, thereby saving the time required to repeatedly analyze the program information.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

The present invention relates to object oriented programming techniques. For those individuals who are not generally familiar with object oriented programming, the Overview section below presents many of the concepts that will help to understand the invention.

1. Overview

Object Oriented Technology v. Procedural Technology

Object oriented programming is a method of implementation in which programs are organized as cooperative collections of objects, each of which represents an instance of some class, and whose classes are all members of a hierarchy of classes united via inheritance relationships. Object oriented programming differs from standard procedural programming in that it uses objects, not algorithms, as the fundamental building blocks for creating computer programs. This difference stems from the fact that the design focus of object oriented programming technology is wholly different than that of procedural programming technology.

The focus of procedural-based design is on the overall process that solves the problem; whereas, the focus of object oriented design is on how the problem can be broken down into a set of autonomous entities that can work together to provide a solution. The autonomous entities of object oriented technology are, of course, objects. Said another way, object oriented technology is significantly different from procedural technology because problems are broken down into sets of cooperating objects instead of into hierarchies of nested computer programs or procedures.

Thus, a pure object oriented program is made up of code entities called objects. Conceptually, an object has two parts, an external object interface and internal object data. In particular, all data is encapsulated by the object interface such that other objects must communicate with that object through its object interface. The only way to retrieve, process or otherwise operate on the encapsulated data is through the methods defined on the object. This protects the internal data portion of the object from outside tampering. Additionally, because outside objects have no access to the internal implementation of an object, that internal implementation can change without affecting other aspects of the program.

In this way, the object system isolates the requestor of services (client objects) from the providers of services (server objects) by a well defined encapsulating interface. Thus, in the classic object model, a client object sends request messages (e.g., method calls) to server objects to perform any necessary or desired function. The message identifies a particular server object and specifies what method is to be performed by the server object, and also supplies any required parameters. The server object receives and interprets the message, and can then determine what service to perform.

Because all operations on an object are expressed as methods called from one object to another, methods can be called by objects in other processes. Objects that reside in one process and that are capable of calling methods on an object in another process (such as a process on a remote computer system) are known as distributed objects.

Many distributed object systems allow interaction between objects in remote locations over a communications link. In a distributed object system a "client object" in one location calls methods on a "server object" in another location, which may be a remote location. The client object—server object interactions form the basis for the distributed object system.

Another central concept in object oriented programming is the class. A class is a template that defines a type of object. A class outlines the makeup of objects that belong to that class. By defining a class, objects can be created that belong to the class without having to rewrite the entire definition for each new object as it is created. This feature of object oriented programming promotes the reusability of existing definitions and promotes efficient use of program code. Each class has corresponding configuration data that determines the features or attributes of the class. Changing the configuration data for a class changes the existing class to a new class.

There are many computer languages that presently support object oriented programming techniques. For example, Smalltalk, Object Pascal, C++ and Java are all examples of programming languages that support object oriented programming to one degree or another.

2.0 Detailed Description

The preferred embodiments allow storing analyzed program information for future use in a cache even if no class file can be identified for a class. When loading a class, if a class file exists, the class file is checked to see if it contains analyzed program information. If so, the analyzed program information may be used. If not, the program information is analyzed and attached as part of the class file. If no class file exists, a cache is searched for corresponding analyzed program information. If none exists, the program information is analyzed, and saved in a entry to the cache. If analyzed program information for the class is found in the cache, the analyzed program information may be used without performing the analysis again. In this manner the preferred embodiments allow caching analyzed program information even for classes that do not have an identifiable class file.

Figure 1:
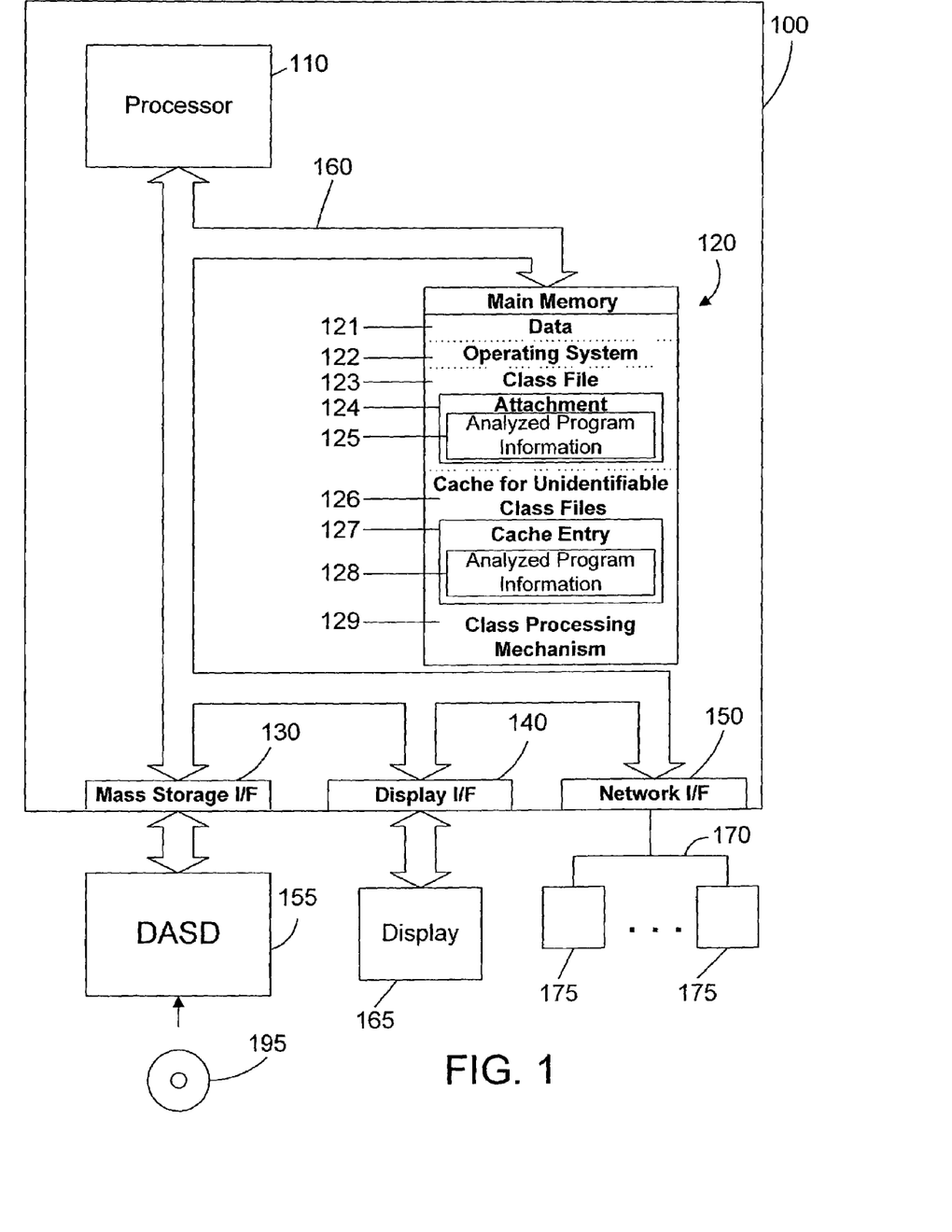
FIG. 1 is a block diagram of an apparatus in accordance with the preferred embodiments.

Referring to FIG. 1, a computer system 100 is one suitable implementation of an apparatus in accordance with the preferred embodiments of the invention. Computer system 100 is an IBM iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices (such as a direct access storage device 155) to computer system 100. One specific type of direct access storage device 155 is a readable and writable CD ROM drive, which may store data to and read data from a CD ROM 195.

Main memory 120 in accordance with the preferred embodiments contains data 121, an operating system 122, one or more class files 123, a cache for unidentifiable class files 126, and a class processing mechanism 129. Data 121 represents any data that serves as input to or output from any program in computer system 100. Operating system 122 is a multitasking operating system known in the industry as OS/400; however, those skilled in the art will appreciate that the spirit and scope of the present invention is not limited to any one operating system. Class file 123 is an object oriented class file, such as a Java class file. Class file 123 may include an attachment 124 that contains analyzed program information 125. Analyzed program information 125 includes information from the class file 123 that was previously processed for a particular platform type. By attaching the analyzed program information 125 to the class file, this apparatus 100 as well as other platforms of the same type may access the analyzed program information 125 without the need of repeating the analysis of the class information.

Cache 126 contains one or more entries 127 that include analyzed program information 128. Cache 126 allows storing analyzed program information 128 in a cache entry 127 even when a corresponding class file cannot be identified. In this manner, apparatus 100 can store analyzed program information in either an attachment to the class file, assuming a class file can be identified, or in a cache entry 127 if no corresponding class file can be identified. Class processing mechanism 129 is a mechanism that processes a class to be loaded. If the class processing mechanism 129 can identify a class file 123 corresponding to the class being loaded, the class processing mechanism 129 checks the class file to see if there is analyzed program information attached to the class file. If so, the class processing mechanism 129 can use the analyzed program information without the overhead of analyzing the program information again. If there is no identifiable class file for the class, the class processing mechanism 129 checks the cache 126 to see if there is an entry 127 in the cache corresponding to the class. If there is no entry in the cache 126 corresponding to the class, the class processing mechanism 129 analyzes program information for the class and saves the analyzed program information in a cache entry 127 for future use. If there is an entry in the cache corresponding to the class, the class processing mechanism 129 retrieves the analyzed program information from the cache, thereby saving the time required to repeatedly analyze the same program information.

In the most preferred implementation, analyzed program information 125 that is attached to a class file is the same as the analyzed program information 129 that is stored in a cache entry. Note, however, that the preferred embodiments expressly extend to different forms and types and formats for analyzed program information 125 that is attached to a class file and analyzed program information 129 that is stored in the cache.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, class file 123, cache 126, and class processing mechanism 129 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol. Because interaction with other computer systems is not required to practice the disclosed invention, network interface 150 is not required in the preferred embodiments.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer-readable signal bearing media used to actually carry out the distribution. Examples of suitable computer-readable signal bearing media include: recordable type media such as floppy disks and CD ROM (e.g., 195 of FIG. 1), and transmission type media such as digital and analog communications links.

Figure 2:
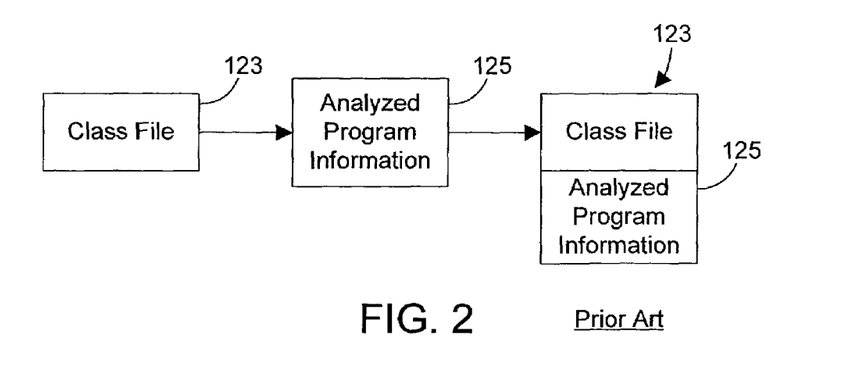
FIG. 2 is a block diagram showing how analyzed program information may be attached to a class file in the prior art.

Referring now to FIG. 2, a prior art method for analyzing program information and attaching the analyzed program information to a class file is graphically represented. First, a class file 123 is processed to generate therefrom analyzed program information 125. The analyzed program information 125 is then attached to the class file 123. In the prior art, the analyzed program information 125 is attached as an attribute to class file 123, allowing class file 123 to be used by any platform while providing the analyzed program information 125 for a particular platform.

Figure 3:
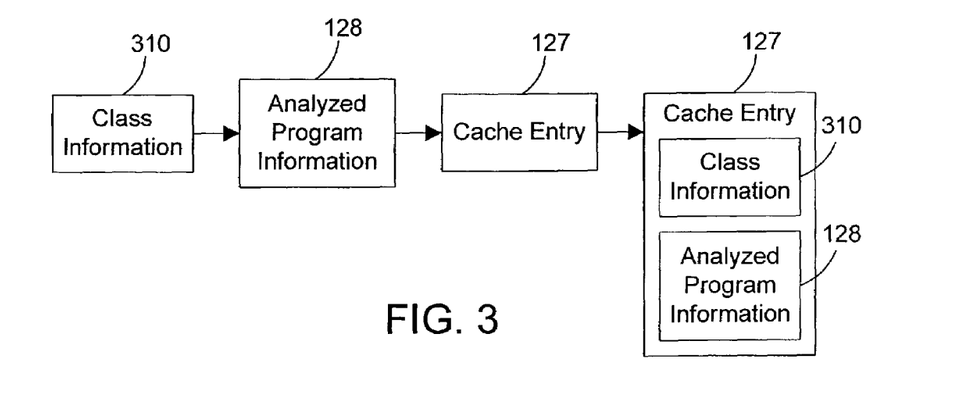
FIG. 3 is a block diagram showing the creation of a cache entry in accordance with the preferred embodiments.

Referring now to FIG. 3, a method for generating a cache entry in accordance with the preferred embodiments is shown. First, class information 310 is processed to generate therefrom analyzed program information 128. A cache entry 127 is then created, and the class information 310 and analyzed program information 128 are stored in the cache entry 127. In this manner, whenever the same class information 310 is provided in the future for the generation of a class, the analyzed program information 128 may be accessed in the cache instead of analyzing the program information each time, even if there is no identifiable corresponding class file.

Note that the term "analyzed program information" as used herein is used in a broad sense to mean any information related in any way to a class that may be processed and that may be useful to store for future use so the processing will not have to be repeated. One example of analyzed program information is platform-specific executable code. Another example of analyzed program information is verification information that indicates the verification status of the class. Verification of a class typically includes checking the class to assure all syntax rules are followed, such as making sure that all names in the class are valid, checking for consistent data types, etc. Verification information may include a list of environment-sensitive checks that must be performed when the class is loaded in order to complete the verification. Yet another example of analyzed program information is an expanded version of some of the non-code information in the class that makes the class easier and quicker to load. Of course, other examples of analyzed program information also fall without the scope of the preferred embodiments.

Figure 4:
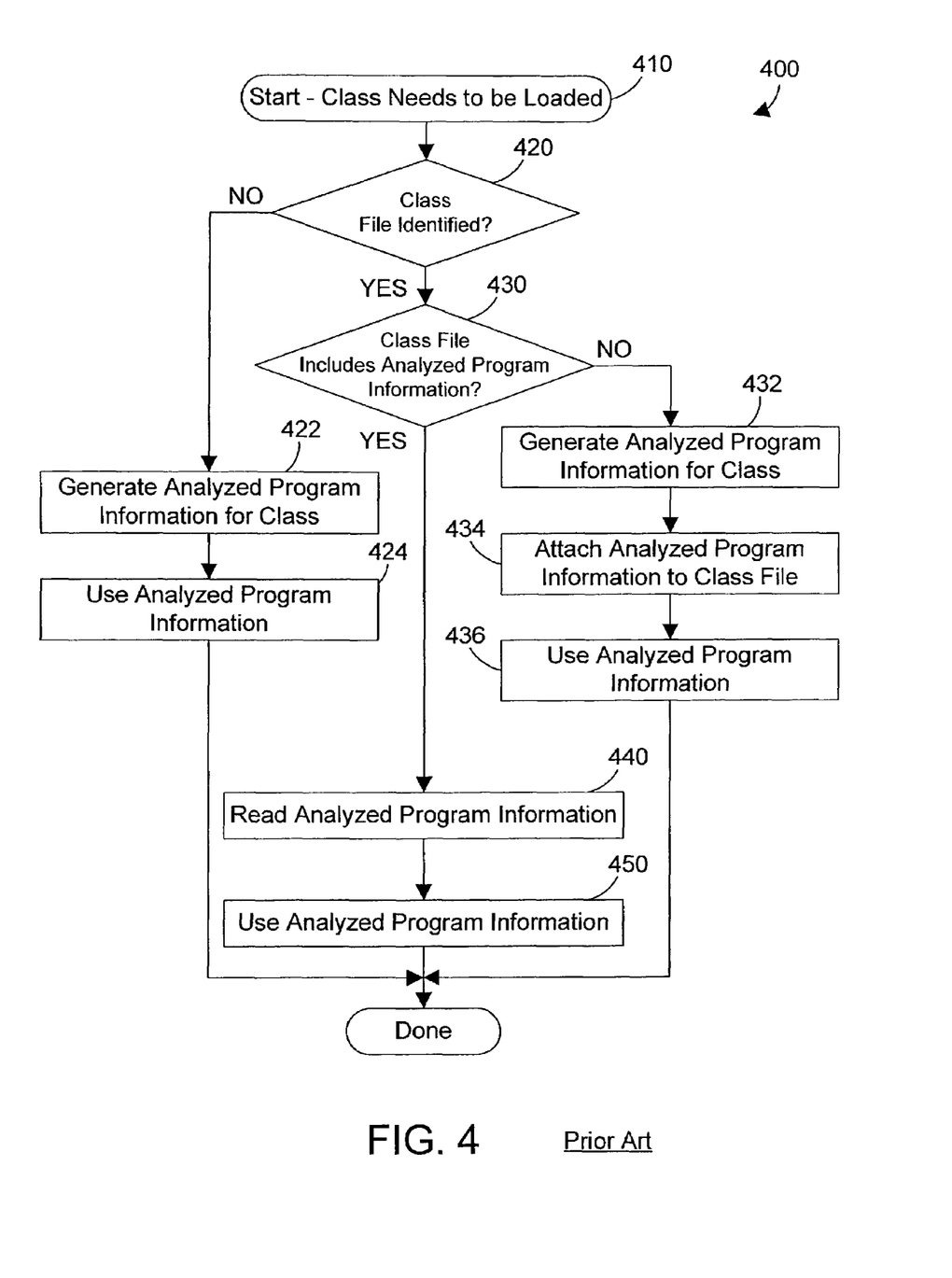
FIG. 4 is a flow diagram of a prior art method for processing a class.

Referring to FIG. 4, a prior art method 400 for processing a class begins when a class need to be loaded (step 410). If a corresponding class file for the class to be loaded can be identified (step 420=YES), we see if the class file includes analyzed program information that was previously stored as part of the class file (step 430). If the class file includes analyzed program information (step 430=YES), the analyzed program information is read from the class file (step 440) and used (step 450). In this manner, program information that was previously analyzed and stored with the class file can be used without the need of repeating the analysis of the program information.

If the class file does not includes analyzed program information (step 430=NO), the program information is analyzed, thereby generating analyzed program information for the class (step 432). The analyzed program information is then attached as part of the class file (step 434), and used as needed (step 436). If no class file can be identified for the class to be loaded (step 420=NO), the program information is analyzed, thereby generating analyzed program information for the class (step 422). The analyzed program information is then used (step 424).

Method 400 graphically illustrates a problem with the prior art. If no class file can be identified for the class being loaded (step 420=NO), the program information must be generated each time (step 422), even if the class was previously analyzed. The preferred embodiments improve on the prior art by providing a way to store analyzed program information for classes that have no identifiable class file.

Figure 5:
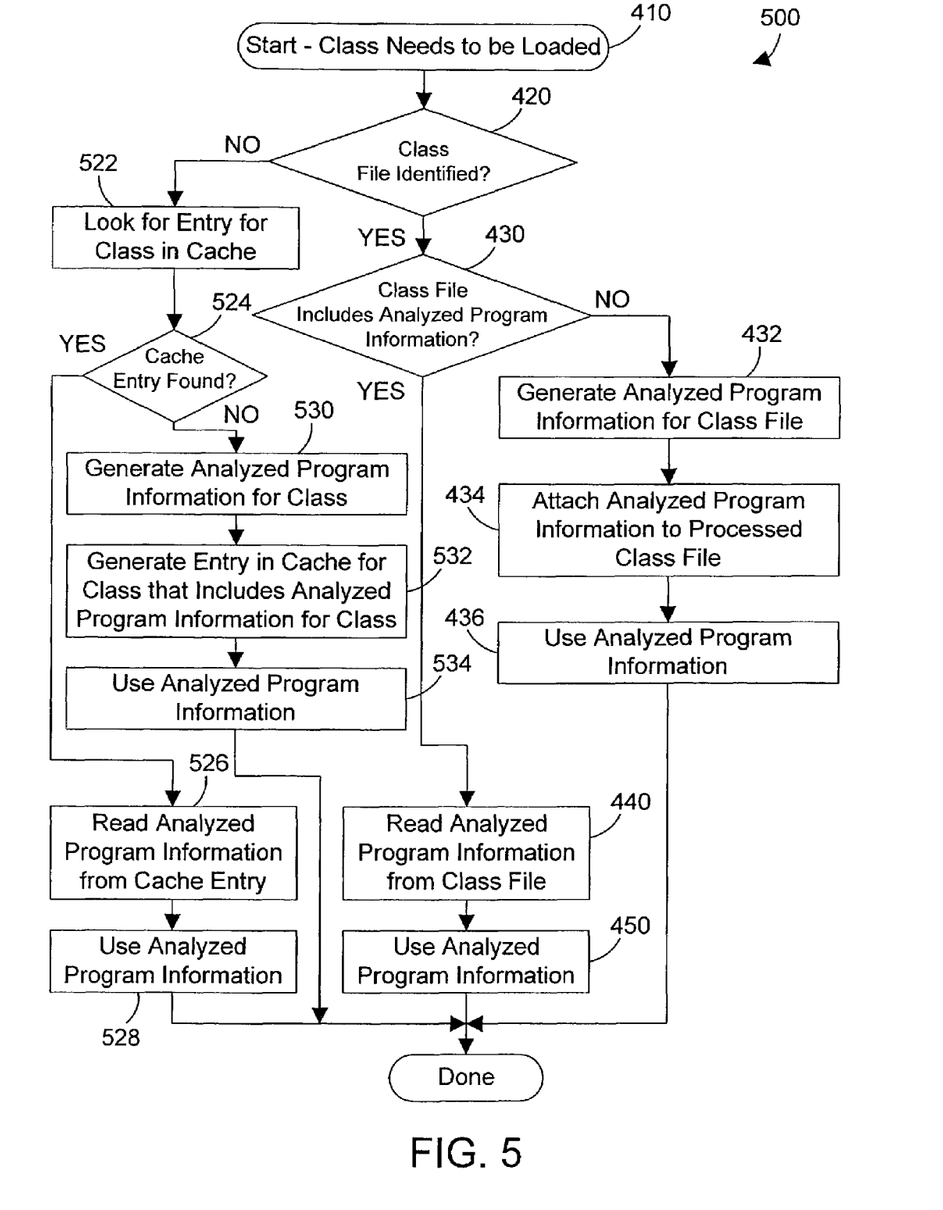
FIG. 5 is a flow diagram of a method for processing a class in accordance with the preferred embodiments.

Referring now to FIG. 5, a method 500 in accordance with the preferred embodiments begins when a class needs to be loaded (step 410). If a corresponding class file can be identified (step 420=YES), the same steps 430, 432, 434, 436, 440 and 450 are performed as described in detail above with respect to FIG. 3. The difference between method 500 of the preferred embodiments and prior art method 400 is what happens when there is no identifiable class file that corresponds to the class being loaded (step 420=NO). In the prior art, if a class file cannot be identified, the class being loaded must be analyzed each time it is loaded, as shown in step 422 of FIG. 4. In the method of the preferred embodiments, however, no such overhead is incurred, because the analyzed program information may be stored in a cache. If no corresponding class file can be identified (step 420=NO), the cache is searched for an entry that corresponds to the class to be loaded (step 522). If a cache entry is found (step 524=YES), the analyzed program information is read from the cache entry (step 526), and is used (step 528). If no cache entry is found that corresponds to the class being loaded (step 524=NO), the class information for the class being loaded is analyzed to generate analyzed program information for the class (step 530). An entry is then generated in the cache for the class being loaded that includes the analyzed program information for the class (step 532). Once the analyzed program information is stored in the cache for future use, it may be used (step 534). Method 500 illustrates that the preferred embodiments store in a cache analyzed program information for classes that do not have an identifiable class file when the class is being loaded. This is a vast improvement over the prior art, which requires processing the class data each time it is loaded if no corresponding class file can be identified.

Figure 6:
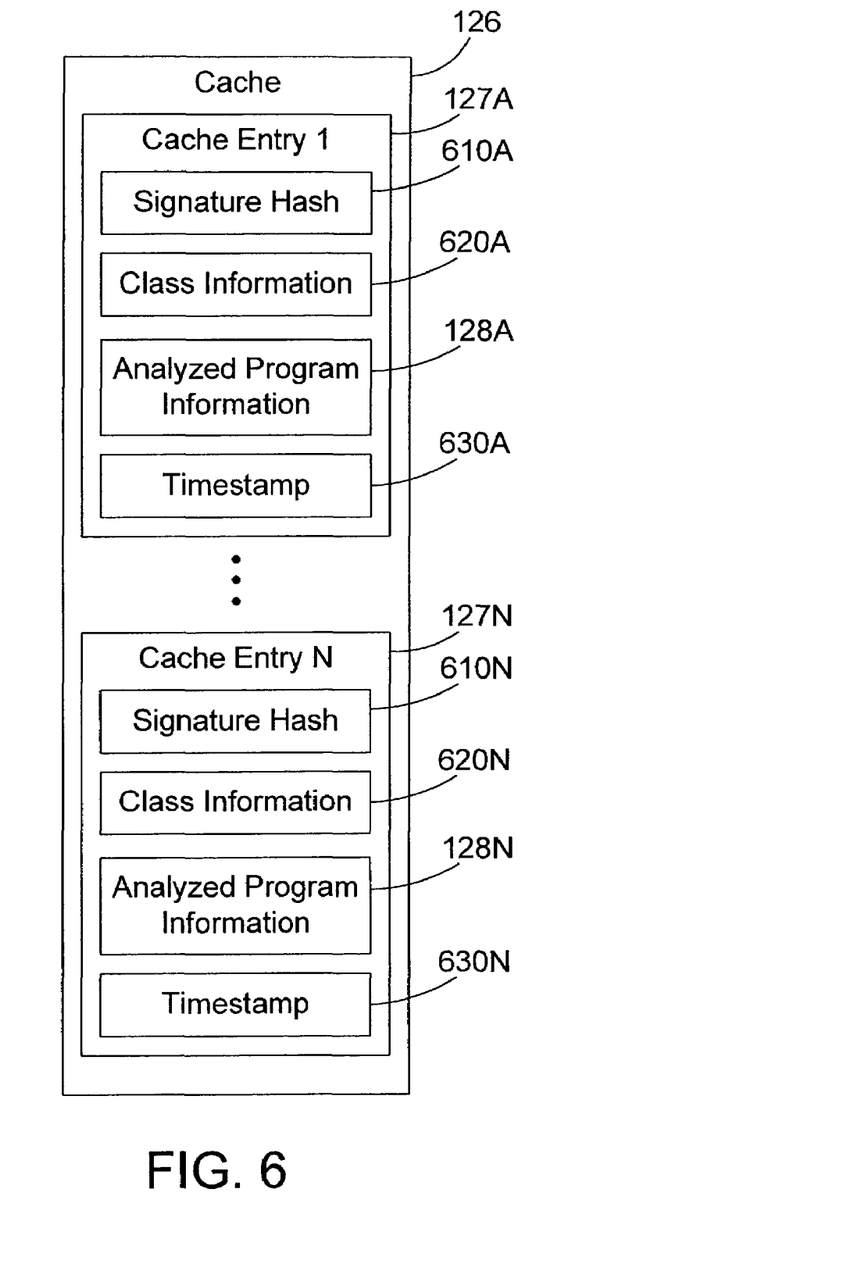
FIG. 6 is a block diagram showing one particular implementation in accordance with the preferred embodiments of cache 126 shown in FIG. 1.

Referring now to FIG. 6, one specific implementation for a cache 126 of FIG. 1 includes multiple entries 127, represented in FIG. 6 by entries 127A and 127N. Entry 127A includes a signature hash field 610A, class information 620A, analyzed program information 128A, and a timestamp 630A. In similar fashion, entry 127N includes a signature hash field 610N, class information 620N, analyzed program information 128N, and a timestamp 630N. Class information 620A is the information that is used to process the class, such as Java bytecodes representative of a Java class. Signature hash 610A is a hash value computed from the class information 620A that allows quickly searching the entries in the cache. Analyzed program information 128A is information relating to the class that has been previously processed, and stored in the cache entry 127A for future use, if needed. Timestamp 630A indicates the time the cache entry was created, and preferably also includes the time the cache entry was last read or modified.

Figure 7:
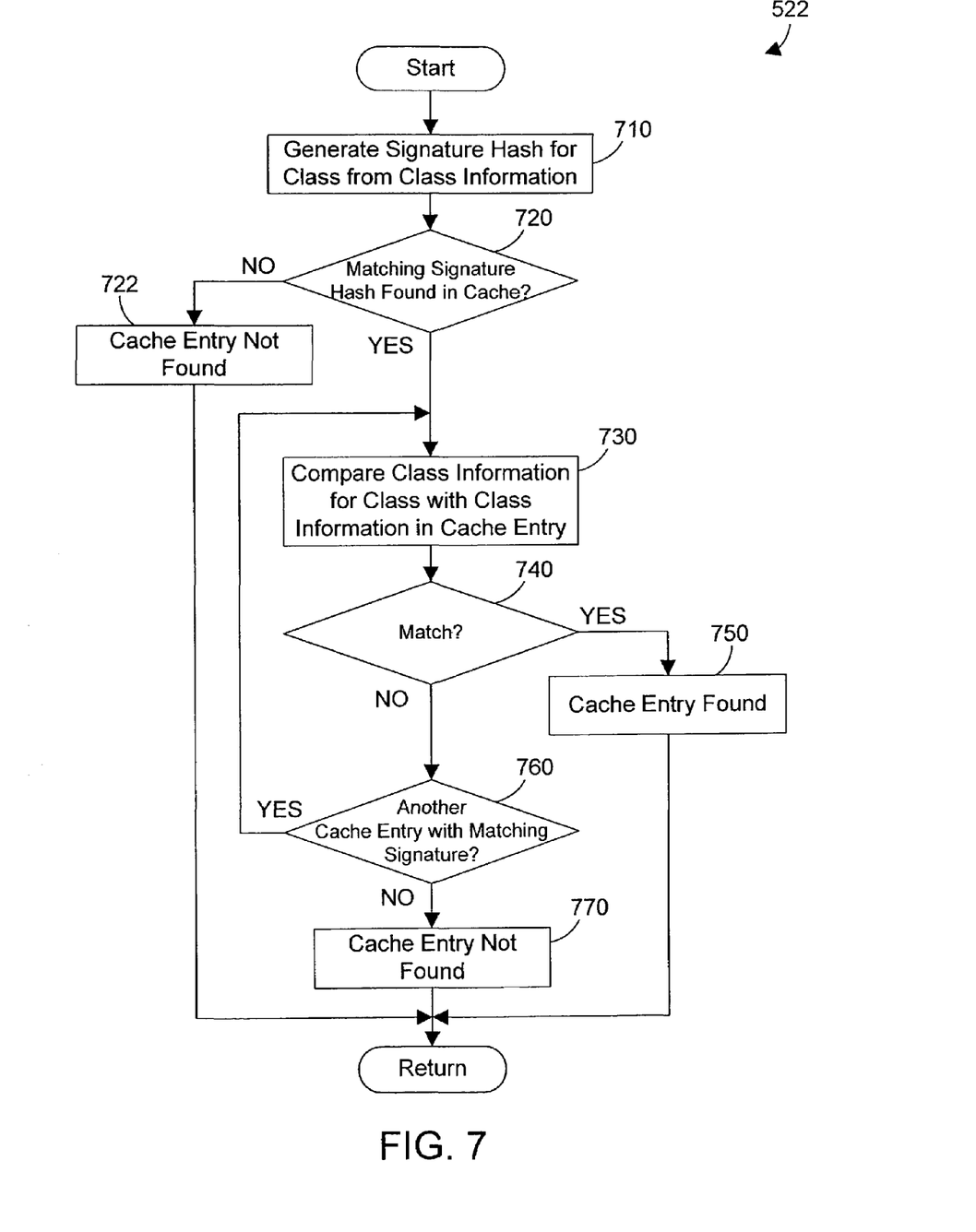
FIG. 7 is a flow diagram of one particular implementation in accordance with the preferred embodiments of a method for processing the cache entries in FIG. 6.

With the cache entries 127 as shown in FIG. 6, a detailed method in FIG. 7 represents steps that can be taken within the scope of the preferred embodiments to accomplish step 522 of FIG. 5, which looks for an entry in the cache that corresponds to the class being processed. First, a signature hash for the class information is generated using the same algorithm used to generate the signature hash values when the cache entries 127 in FIG. 6 were created (step 710). If there is no matching signature hash found in the cache (step 720=NO), a cache entry was not found (step 722). If there is a matching signature hash found in the cache (step 720=YES), the class information for the class is compared with the class information 620 stored in the cache entry (step 730). In the preferred embodiments, this is a byte-by-byte comparison that must match exactly to indicate a match. This second level of comparison is required if the signature hash may have the same value for multiple entries in the cache. If the class information matches the class information in the cache entry (step 740=YES), a cache entry was found (step 750). If the class information does not match the stored class information in the cache entry (step 740=NO), we see if there is another cache entry with the same matching signature hash (step 760). If so (step 760=YES), control is passed to step 730, and processing continues. If there are no more cache entries with matching signature hash values (step 760=NO), no cache entry was found (step 770). Once step 522 in FIG. 7 determines whether or not there is a corresponding cache entry in one of steps 722, 750, or 770, step 522 returns, and control is passed to step 524 in FIG. 5, which then takes action depending on whether or not step 522 indicated there was a corresponding cache entry for the class being processed.

Figure 8:
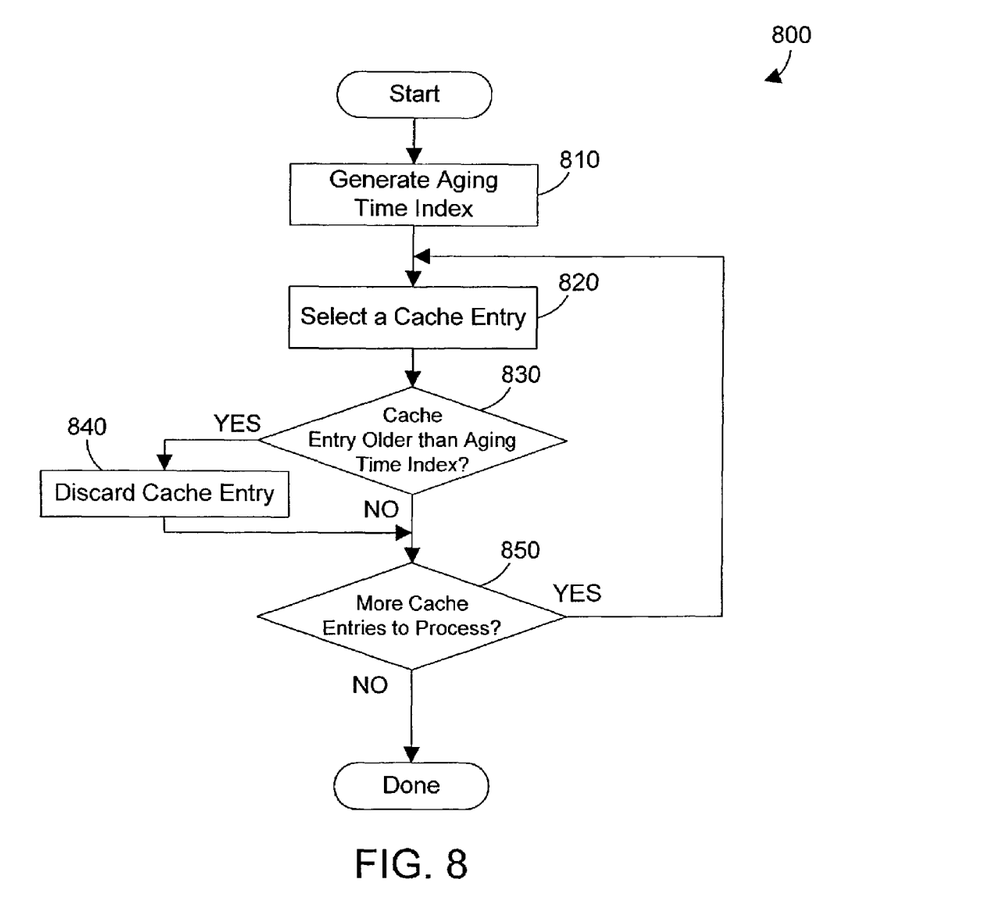
FIG. 8 is a flow diagram of a method for discarding cache entries based on their timestamp in accordance with the preferred embodiments.

FIG. 8 shows a method 800 for aging out cache entries using the timestamp 630 shown in FIG. 6. First, an aging time index is generated (step 810). The aging time index is preferably a time specification that is selected so that cache entries older than the aging time index are discarded, while cache entries that are newer than the aging time index are maintained in the cache. A cache entry is selected (step 820). The timestamp in the cache entry is then compared with the aging time index (step 830). If the timestamp indicates the cache entry is older than the aging time index (step 830=YES), the cache entry is discarded (step 840). If the timestamp indicates the cache entry is not older than the aging time index (step 830=NO), the cache entry is not discarded. If there are more cache entries to process (step 850=YES), control passes to step 820 and processing continues until there are no more entries to process (step 850=NO). Method 800 is shown as one suitable example of a method for cleaning up a cache when some of the entries become too old to be useful. For the specific method 800 shown in FIG. 8, we assume that the timestamp in a cache entry is updated each time the cache entry is accessed.

Note that the cache disclosed herein may be made persistent so it is still available even if the computer system is rebooted. In addition, the cache may be shared among simultaneously operating JVMs in the system, and may be persistent even when no JVM is active in the system.

The preferred embodiments enhance the functionality of object oriented computer system by providing a way to cache analyzed program information for classes that have no identifiable class file as well as classes that have identifiable class files. By storing the analyzed program information in the cache, this information may be retrieved later and used without the overhead of repeatedly performing the processing that generated the analyzed program information.

Note that the examples shown in the figures and discussed herein as representative of the preferred embodiments are extremely simplified for the purpose of illustrating the invention without getting bogged down in the details of implementing the invention on any particular platform. Given the teachings herein, the implementation of an apparatus and method in accordance with the preferred embodiments for a selected platform type and for a selected object oriented language is within the capabilities of one of ordinary skill in the art.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention. For example, the preferred embodiments discussed above disclose attaching analyzed program information to a class file if one can be identified, and storing the analyzed program information in the cache if no corresponding class file can be identified. Note, however, that it is equally within the scope of the preferred embodiments to store analyzed program information in the cache for classes that have identifiable class files as well as for classes that do not. This implementation would allow a single cache to be used, rather than providing separate logic for the case of an identifiable class file that is different than the logic for the case of an unidentifiable class file. These and other variations are expressly within the scope of the preferred embodiments.

What is claimed is:

1. An apparatus comprising:
    at least one processor;
    a memory coupled to the at least one processor; and
    a class processing mechanism residing in the memory and executed by the at least one processor, the class processing mechanism writing a plurality of entries to a cache residing in the memory, each entry including analyzed program information for an object oriented class that has no identifiable corresponding class file when the corresponding object oriented class is loaded;

wherein, if a selected class to be loaded has no identifiable corresponding class file, the class processing mechanism determines whether an entry in the cache exists that includes analyzed program information corresponding to the selected class;

if an entry in the cache exists that includes analyzed program information corresponding to the selected class, the class processing mechanism uses the analyzed program information; and if no entry in the cache exists that includes analyzed program information corresponding to the selected class, the class processing mechanism analyzes program information corresponding to the selected class to generate therefrom new analyzed program information corresponding to the selected class, and writes the new analyzed program information corresponding to the selected class to an entry in the cache.

2. The apparatus of claim 1 wherein the analyzed program information includes platform-specific executable code.

3. The apparatus of claim 1 wherein the analyzed program information includes verification data for the object oriented class.

4. The apparatus of claim 1 wherein the analyzed program information includes an expanded version of non-code information in the class.

5. The apparatus of claim 1 further comprising a plurality of object oriented class files residing in the memory.

6. The apparatus of claim 5 wherein at least one of the plurality of object oriented class files includes analyzed program information corresponding to the class represented by the class file.

7. An apparatus comprising:
at least one processor;
a memory coupled to the at least one processor;
a class processing mechanism residing in the memory and executed by the at least one processor, the class processing mechanism writing a plurality of entries to a cache residing in the memory, each entry including analyzed program information for an object oriented class that has no identifiable corresponding class file when the corresponding object oriented class is loaded, and wherein the class processing mechanism determines whether a selected class to be loaded has a corresponding class file, and if so, the class processing mechanism determines whether the corresponding class file includes analyzed program information, and if the corresponding class file includes analyzed program information, the class processing mechanism uses the analyzed program information, and if the corresponding class file does not include analyzed program information, the class processing mechanism generates new analyzed program information corresponding to the selected class and stores the new analyzed program information in the corresponding class file.

8. The apparatus of claim 7 wherein the analyzed program information includes platform-specific executable code.

9. The apparatus of claim 7 wherein the analyzed program information includes verification data for the object oriented class.

10. The apparatus of claim 7 wherein the analyzed program information includes an expanded version of non-code information in the class.

11. The apparatus of claim 7 wherein, if a selected class to be loaded has no identifiable corresponding class file, the class processing mechanism determines whether an entry in the cache exists that includes analyzed program information corresponding to the selected class;

if an entry in the cache exists that includes analyzed program information corresponding to the selected class, the class processing mechanism uses the analyzed program information; and if no entry in the cache exists that includes analyzed program information corresponding to the selected class, the class processing mechanism analyzes program information corresponding to the selected class to generate therefrom new analyzed program information corresponding to the selected class, and writes the new analyzed program information corresponding to the selected class to an entry in the cache.

12. An apparatus comprising:
at least one processor;
a memory coupled to the at least one processor;
a plurality of object oriented class files residing in the memory, wherein at least one of the plurality of object oriented class files includes analyzed program information corresponding to the class represented by the class file;

a cache residing in the memory that contains a plurality of entries, each entry including analyzed program information for an object oriented class that has no identifiable corresponding class file when the corresponding object oriented class is loaded; and a class processing mechanism residing in the memory and executed by the at least one processor, the class processing mechanism storing at least one entry in the cache that includes analyzed program information that the class processing mechanism generates for an object oriented class that has no identifiable corresponding class file;

wherein the class processing mechanism determines whether a selected class to be loaded has a corresponding class file, and if so, the class processing mechanism determines whether the corresponding class file includes analyzed program information, and if the corresponding class file includes analyzed program information, the class processing mechanism uses the analyzed program information, and if the corresponding class file does not include analyzed program information, the class processing mechanism generates first analyzed program information corresponding to the selected class and stores the first analyzed program information in the corresponding class file.

13. The apparatus of claim 12 wherein, if the class to be loaded does not have an identifiable corresponding class file, the class processing mechanism determines whether the selected class has an identifiable corresponding class file;

if the selected class has no identifiable corresponding class file, the class processing mechanism determines whether an entry in a cache exists that includes analyzed program information corresponding to the selected class;

if an entry in the cache exists that includes analyzed program information corresponding to the selected class, the class processing mechanism uses the analyzed program information; and if no entry in the cache exists that includes analyzed program information corresponding to the selected class, the class processing mechanism analyzes program information corresponding to the selected class to generate therefrom second analyzed program information corresponding to the selected class, and writes the second analyzed program information corresponding to the selected class to an entry in the cache.

14. A computer-implemented method for processing a selected object oriented class, the method comprising the steps of:
   determining whether the selected class has an identifiable corresponding class file;
   if the selected class has no identifiable corresponding class file, determining whether an entry in a cache exists that includes analyzed program information corresponding to the selected class;
   if an entry in the cache exists that includes analyzed program information corresponding to the selected class, using the analyzed program information; and
   if no entry in the cache exists that includes analyzed program information corresponding to the selected class, analyzing program information corresponding to the selected class to generate therefrom first analyzed program information corresponding to the selected class, and writing the first analyzed program information to an entry in the cache.

15. The method of claim 14 further comprising the steps of:
   if the selected class has an identifiable corresponding class file, determining whether the corresponding class file includes analyzed program information corresponding to the selected class;
   if the corresponding class file includes analyzed program information corresponding to the selected class, using the analyzed program information; and
   if the corresponding class file does not include analyzed program information corresponding to the selected class, analyzing program information corresponding to the selected class to generate therefrom second analyzed program information corresponding to the selected class, and including the second analyzed program information as part of the class file.

16. The method of claim 14 wherein the analyzed program information includes platform-specific executable code.

17. The method of claim 14 wherein the analyzed program information includes verification data for the object oriented class.

18. The method of claim 14 wherein the analyzed program information includes an expanded version of non-code information in the class.

19. A computer-implemented method for processing a selected object oriented class, the method comprising the steps of:
   if the selected class has an identifiable corresponding class file, determining whether the corresponding class file includes analyzed program information corresponding to the selected class;
   if the identifiable corresponding class file includes analyzed program information corresponding to the selected class, using the analyzed program information;
   if the identifiable corresponding class file does not include analyzed program information corresponding to the selected class, analyzing program information corresponding to the selected class to generate therefrom first analyzed program information corresponding to the selected class, and including the first analyzed program information as part of the class file;
   if the selected class does not have an identifiable corresponding class file, determining whether a cache entry in a cache exists that includes analyzed program information corresponding to the selected class;
   if a cache entry exists that includes analyzed program information corresponding to the selected class, using the analyzed program information; and
   if no cache entry exists that includes analyzed program information corresponding to the selected class, analyzing program information corresponding to the selected class to generate therefrom second analyzed program information corresponding to the selected class, and writing the second analyzed program information corresponding to the selected class to an entry in the cache.

20. The method of claim 19 wherein the analyzed program information includes platform-specific executable code.

21. The method of claim 19 wherein the analyzed program information includes verification data for the object oriented class.

22. The method of claim 19 wherein the analyzed program information includes an expanded version of non-code information in the class.

23. A program product comprising:
   (A) a class processing mechanism that writes a plurality of entries to a cache, each entry including analyzed program information for an object oriented class that has no identifiable corresponding class file when the object oriented class is loaded, wherein the class processing mechanism determines whether a selected class to be loaded has a corresponding class file, and if so, the class processing mechanism determines whether the corresponding class file includes analyzed program information, and if the corresponding class file includes analyzed program information, the class processing mechanism uses the analyzed program information, and if the corresponding class file does not include analyzed program information, the class processing mechanism generates new analyzed program information corresponding to the selected class and stores the new analyzed program information in the corresponding class file; and
   (B) computer-recordable media bearing the class processing mechanism.

24. The program product of claim 23 wherein the analyzed program information includes platform-specific executable code.

25. The program product of claim 23 wherein the analyzed program information includes verification data for the object oriented class.

26. The program product of claim 23 wherein the analyzed program information includes an expanded version of non-code information in the class.

27. The program product of claim 23 wherein, if a selected class to be loaded has no identifiable corresponding class file, the class processing mechanism determines whether an entry in the cache exists that includes analyzed program information corresponding to the selected class;
   if an entry in the cache exists that includes analyzed program information corresponding to the selected class, the class processing mechanism uses the analyzed program information; and
   if no entry in the cache exists that includes analyzed program information corresponding to the selected class, the class processing mechanism analyzes program information corresponding to the selected class to generate therefrom new analyzed program information corresponding to the selected class, and writes the new analyzed program information corresponding to the selected class to an entry in the cache.

28. A program product comprising:
(A) a class processing mechanism that:
(A1) determines whether a selected class has an identifiable corresponding class file;
(A2) if the selected class has no identifiable corresponding class file, the class processing mechanism determines whether an entry in a cache exists that includes analyzed program information corresponding to the selected class;
(A3) if an entry in the cache exists that includes analyzed program information corresponding to the selected class, the class processing mechanism uses the analyzed program information;
(A4) if no entry in the cache exists that includes analyzed program information corresponding to the selected class, the class processing mechanism analyzes program information corresponding to the selected class to generate therefrom first analyzed program information corresponding to the selected class, the class processing mechanism writing the first analyzed program information to an entry in the cache; and
(B) computer-recordable media bearing the class processing mechanism.

29. The program product of claim 28 wherein the class processing mechanism determines whether a selected class to be loaded has a corresponding class file, and if so, the class processing mechanism determines whether the corresponding class file includes analyzed program information, and if the corresponding class file includes analyzed program information, the class processing mechanism uses the analyzed program information, and if the corresponding class file does not include analyzed program information, the class processing mechanism generates second analyzed program information corresponding to the class to be loaded and stores the second analyzed program information in the corresponding class file.

30. The program product of claim 29 wherein, if the class to be loaded does not have an identifiable corresponding class file, the class processing mechanism determines whether the selected class has an identifiable corresponding class file;
if the selected class has no identifiable corresponding class file, the class processing mechanism determines whether an entry in a cache exists that includes analyzed program information corresponding to the selected class;
if an entry in the cache exists that includes analyzed program information corresponding to the selected class, the class processing mechanism uses the analyzed program information; and
if no entry in the cache exists that includes analyzed program information corresponding to the selected class, the class processing mechanism analyzes program information corresponding to the selected class to generate therefrom second analyzed program information corresponding to the selected class, and writes the second analyzed program information corresponding to the selected class to an entry in the cache.

* * * * *